United States Patent
Verhaeghe et al.

(10) Patent No.: US 10,076,081 B2
(45) Date of Patent: Sep. 18, 2018

(54) AGRICULTURAL BALER WITH BUFFER CHAMBER ARRANGED BEFORE THE PRE-COMPRESSION CHAMBER

(71) Applicant: CNH Industrial America LLC, New Holland, PA (US)

(72) Inventors: Didier O. M. Verhaeghe, Ypres (BE); Ward Bonte, Heuvelland (BE); Frederick Timmerman, Bruges (BE)

(73) Assignee: CNH Industrial America LLC, New Holland, PA (US)

( * ) Notice: Subject to any disclaimer, the term of this patent is extended or adjusted under 35 U.S.C. 154(b) by 903 days.

(21) Appl. No.: 14/412,924

(22) PCT Filed: Jun. 25, 2013

(86) PCT No.: PCT/EP2013/063228
§ 371 (c)(1),
(2) Date: Jan. 5, 2015

(87) PCT Pub. No.: WO2014/005882
PCT Pub. Date: Jan. 9, 2014

(65) Prior Publication Data
US 2015/0189836 A1 Jul. 9, 2015

(30) Foreign Application Priority Data
Jul. 4, 2012 (BE) .................... 2012/0454

(51) Int. Cl.
*A01F 15/10* (2006.01)
*A01F 15/04* (2006.01)

(52) U.S. Cl.
CPC .......... *A01F 15/101* (2013.01); *A01F 15/046* (2013.01); *A01F 15/10* (2013.01); *A01F 2015/102* (2013.01)

(58) Field of Classification Search
CPC ...... A01F 15/10; A01F 15/101; A01F 15/046; A01F 2015/102
(Continued)

(56) References Cited

U.S. PATENT DOCUMENTS 2,122,052 A * 6/1938 Bell ................. A01D 61/02
198/604
2,552,888 A * 5/1951 Druetta .................. A01F 15/04
100/137

(Continued)

FOREIGN PATENT DOCUMENTS

DE 1937606 A1 2/1971
DE 4329469 A1 3/1995
(Continued)

*Primary Examiner* — Jimmy T Nguyen
(74) *Attorney, Agent, or Firm* — Patrick M. Sheldrake

(57) ABSTRACT

An agricultural baler equipped with a pre-compression chamber supplied with crop material by a suitable supply or arrangement or component, and configured to guide crop material from the supply towards and into the baling chamber where the rectangular bales are formed. The baler of the invention is provided with a buffer chamber located before the pre-compression chamber, the floor of said buffer chamber being formed by a conveyor belt configured to move at a constant speed. The buffer chamber diminishes the irregularity with which crops are supplied to the pre-compression chamber.

19 Claims, 13 Drawing Sheets

(58) Field of Classification Search
USPC .................................... 100/7, 188 R; 56/341
See application file for complete search history.

(56) References Cited

U.S. PATENT DOCUMENTS

| | | | |
|---|---|---|---|
| 2,909,887 A * | 10/1959 | Claas | A01F 15/10 |
| | | | 100/189 |
| 4,962,632 A | 10/1990 | Schoonheere et al. | |
| 5,092,114 A * | 3/1992 | Eggenmueller | A01F 15/04 |
| | | | 100/189 |
| 5,467,702 A | 11/1995 | Naaktgeboren et al. | |
| 6,032,446 A | 3/2000 | Gola et al. | |
| 7,047,719 B2 | 5/2006 | Dubois | |
| 8,627,765 B2 | 1/2014 | Van Buuren | |
| 2012/0186465 A1* | 7/2012 | Dresher | A01F 15/101 |
| | | | 100/35 |

FOREIGN PATENT DOCUMENTS

| | | |
|---|---|---|
| DE | 4341609 A1 | 6/1995 |
| EP | 1135017 A1 | 9/2001 |
| FR | 895746 A | 2/1945 |
| GB | 1150050 A | 4/1969 |

\* cited by examiner

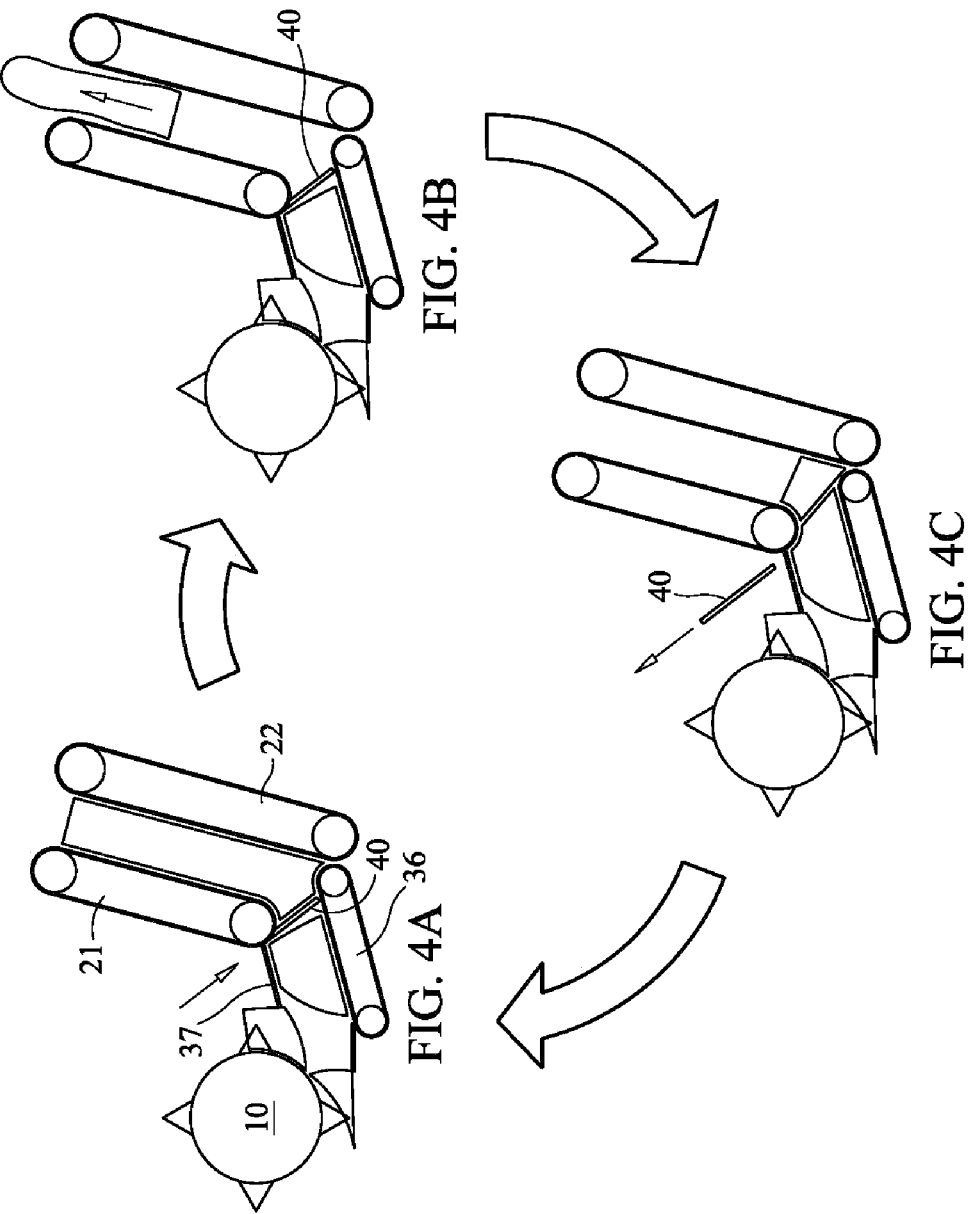

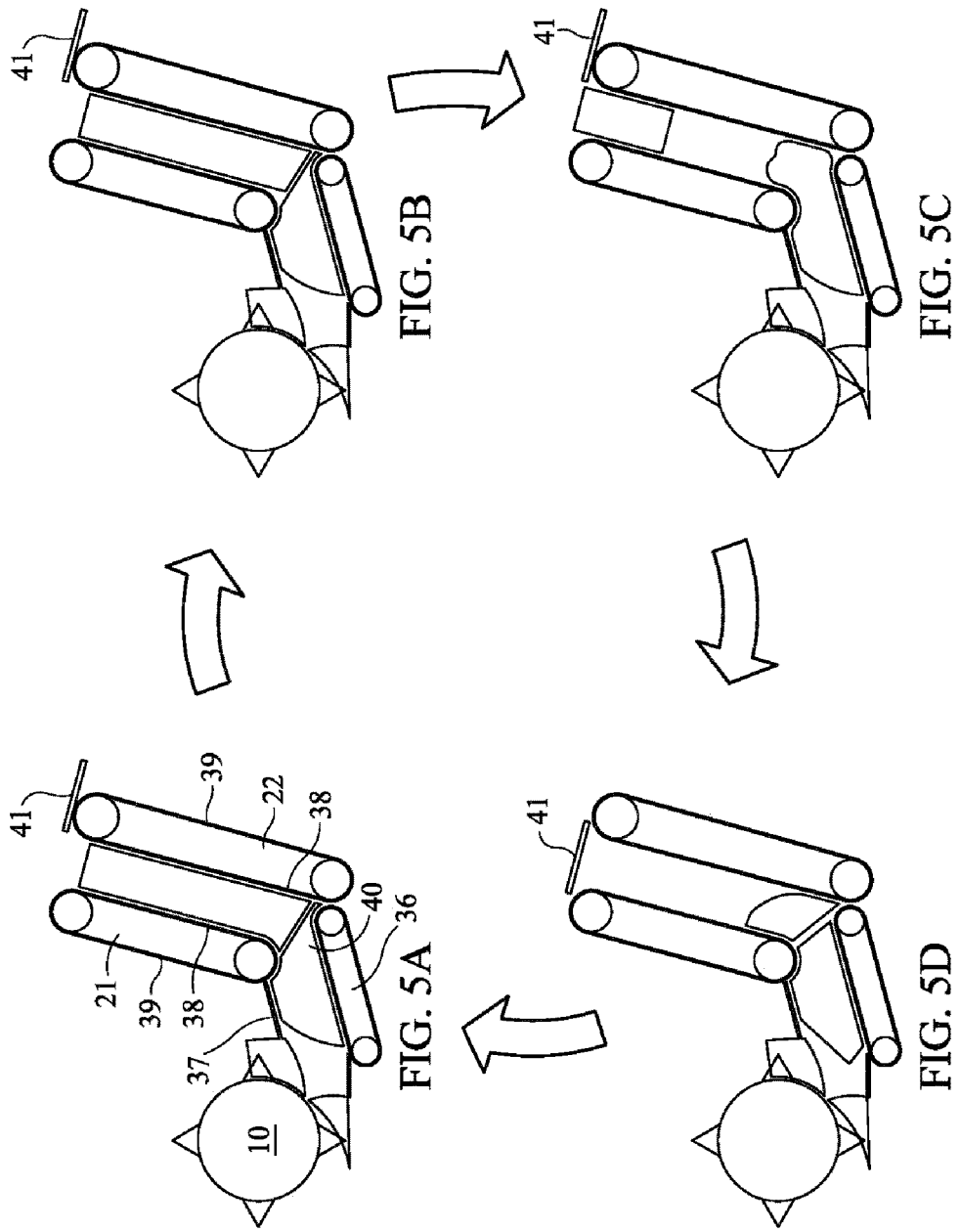

ations to agricultural balers,
AGRICULTURAL BALER WITH BUFFER CHAMBER ARRANGED BEFORE THE PRE-COMPRESSION CHAMBER This application is the US National Stage filing of International Application Serial No. PCT/EP2013/063228 filed on Jun. 25, 2013 which claims priority to Belgian Application BE2012/0454 filed Jul. 4, 2012, each of which is incorporated herein by reference in its entirety.

FIELD OF THE INVENTION

The present invention is related to agricultural balers, used for picking up crop material such as hay or straw from the field or receiving crop material from a harvester, and forming it into rectangular packages. The invention is in particular related to a feeding system for feeding crop material into the baling chamber.

STATE OF THE ART

Agricultural square balers gather crop material into a baling chamber where the material is compressed by a reciprocating plunger to form rectangular packages. The crop material is supplied by a supply system into a pre-compression chamber, which is often a curved chamber arranged between the outlet of the supply system and the inlet of the baling chamber. Examples of existing systems of this type are disclosed in US-A-2005/0072133 and EP-A-0636308. In these existing systems, a stuffer arrangement is used that is equipped with stuffer forks which move the crop material from the bottom of the pre-compression chamber towards the baling chamber, and subsequently sweep the material that has gathered in the pre-compression chamber into the baling chamber. The movement of the stuffer arrangement and of the plunger is synchronized so that the plunger is moved backwards before the crops are fed into the baling chamber and forwards as soon as the material has fully entered the baling chamber.

A problem of the rotating fork arrangements for stuffing the material into the baling chamber is that they are mechanically complex and therefore problematic when it comes to working at the ever increasing production speeds that are required in the present-day agricultural business.

Conveyor-based systems for advancing crops towards the baling chamber are also known. Some older baling systems of this type are shown in documents FR-A-895746 and U.S. Pat. No. 2,552,888, where conveyors are applied for advancing material towards the baling chamber.

A problem with any of the above-described pre-compression mechanisms is that the influx of material from the field towards the pre-compression chamber is not constant. This creates problems of overfeeding the chamber prematurely or insufficiently during the filling cycle of the pre-compression chamber, leading in turn to an inefficient filling process of the baling chamber. In the specific case of a pre-compression chamber equipped with one or more conveyor belts, these problems are especially acute. Given that the belts are continuously moving, there is a risk of crop material entering prematurely into the pre-compression chamber and/or of material becoming trapped at the top of the pre-compression chamber or between the rolls of the conveyor belts and the baling chamber.

SUMMARY OF THE INVENTION

The present invention is related to an agricultural baler and to a method as described in the appended claims. The present invention is related to an agricultural baler equipped with a pre-compression chamber supplied with crop material by a suitable supply means, and configured to guide crop material from said supply means towards and into the baling chamber where the rectangular bales are formed. The baler of the invention is provided with a buffer chamber located before the pre-compression chamber, the floor of said buffer chamber being formed by a conveyor belt configured to move at a constant speed. The buffer chamber diminishes the irregularity with which crops are supplied to the pre-compression chamber. The buffer is especially advantageous in combination with a pre-compression chamber equipped with a pair of conveyor belts that form the lower and upper wall of said pre-compression chamber. According to preferred embodiments, such a pre-compression chamber is provided with closing means at its inlet and/or outlet sections. Such closing means may be formed of rows of hooks that are pivotable into and out of a closing position. According to preferred embodiments, scrapers are provided between the conveyor belts forming the pre-compression chamber and the outlet of said chamber.

BRIEF DESCRIPTION OF THE FIGURES

FIG. 4 shows the operational phases of a pre-compression chamber and buffer chamber in a baler according to the present invention, with a closing mechanism provided at the inlet of the pre-compression chamber.

FIG. 5 shows the operational phases of a pre-compression chamber and buffer chamber in a baler according to the present invention, with a closing mechanism provided at the outlet of the pre-compression chamber.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims.

Figure 1:
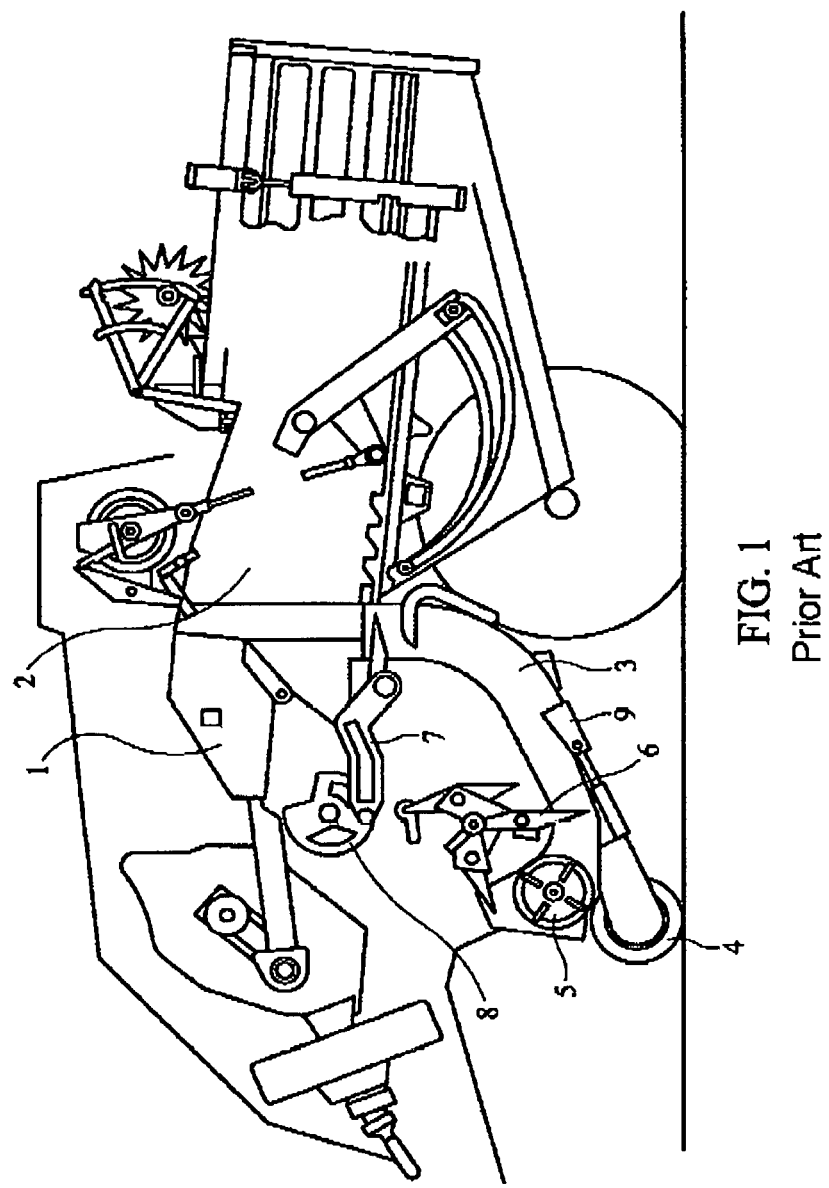
FIG. 1 illustrates a baler for producing rectangular bales according to the prior art, provided with a packer and a stuffer fork for feeding pre-compressed crops to the baling chamber.
Figure 2:
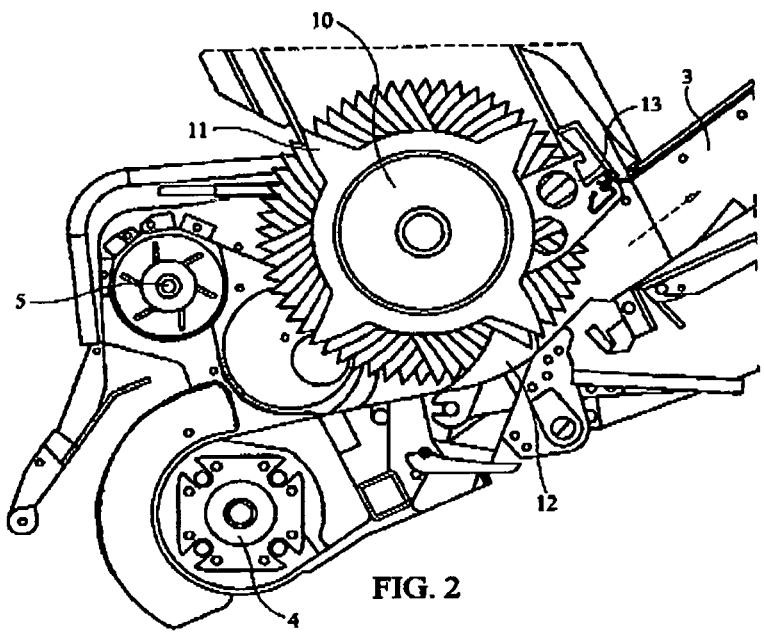
FIG. 2 shows an alternative for the packer of FIG. 1: a feeding rotor equally known in the art.

In order to identify the components of a rectangular baler to which the invention is related, FIG. 1 illustrates an example of a rectangular baler presently known in the art. The following components are indicated: the plunger 1, the baling chamber 2, the pre-compression chamber 3, a pick-up mechanism 4 and a guide roll 5 configured to transport harvested crops towards a packer mechanism 6 for supplying crops to the pre-compression chamber, and a stuffer fork 7 configured to push a slice of crops that has gathered in the pre-compression chamber, upwards into the baling chamber 2. The stuffer fork 7 is actuated by a rotatable drive means 8, configured to drive the fork only when the pre-compression chamber is full (as detected by a detector 9), and when the plunger 1 is in the retracted position. FIG. 2 illustrates an (equally known) alternative for the packer 6: this is a rotor 10 equipped with a set of plates 11 arranged along the axis of the rotor, and shifted radially with respect to each other. Knives 12 are arranged for cutting the crops that are gathered by the rotor, and scrapers 13 are arranged for removing the crops from the rotor before they are fed into the pre-compression chamber 3. The dotted line shows the path followed by the harvested crops.

Figure 3:
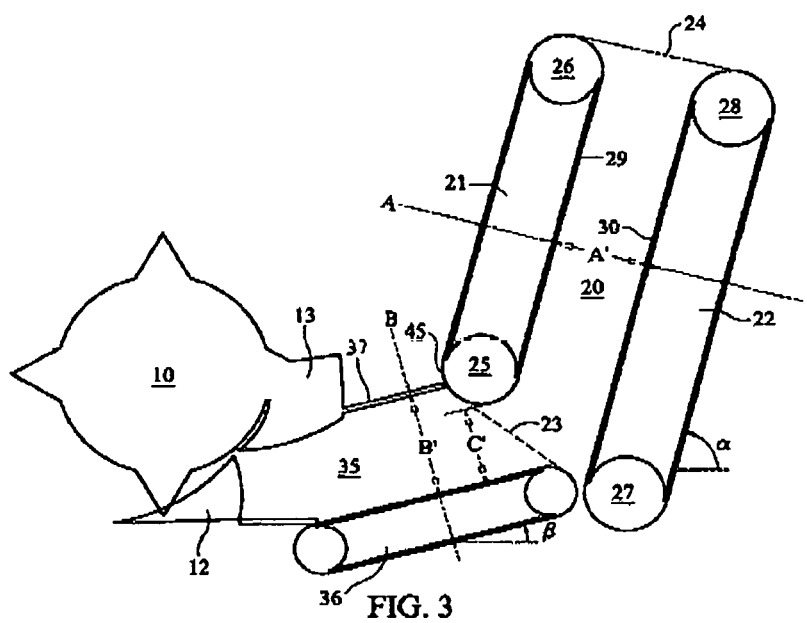
FIG. 3 shows the main components of a pre-compression chamber and a buffer chamber according an embodiment of the present invention.

FIG. 3 shows a pre-compression mechanism in a baler according to a preferred embodiment of the invention. The rotor 10 equipped with the knives 12 and the scraper 13 and are the same as the ones shown in FIG. 2. The pre-compression chamber 20 is defined by two conveyor belts 21 and 22, extending between the pre-compression chamber's inlet and outlet sections 23 and 24. Each of the conveyor belts is mounted between pairs of rolls 25/26 and 27/28 respectively. The upper and lower walls 29 and 30 of the pre-compression chamber are thus formed by straight and mutually parallel portions of said belts moving past the pre-compression chamber's interior space 20. Said upper and lower walls 29/30 are oriented at a slanted angle α with respect to the horizontal direction. The width of the conveyor belts (as measured in the direction perpendicular to the drawing in FIG. 3), is preferably constant. The remaining sidewalls of the pre-compression chamber 20 are formed by plates which are preferably parallel to the plane of the drawing. Alternatively, these sidewalls can be arranged to converge in the direction of movement of the crops in the pre-compression chamber 20. This may be achieved by placing these converging sidewalls in between the parallel conveyor belts 21/22 of constant width, so that a gradually decreasing portion of the conveyor belts is in contact with the crops as they advance towards the baling chamber. Possibly in combination with these converging vertical sidewalls, the distance between the upper and lower walls 29 and 30 of the pre-compression chamber may be decreasing from the inlet 23 to the outlet 24. This can be achieved by mounting the conveyor belts 21 and 22 at a suitable angle with respect to each other.

Upstream of the belts 21/22, and downstream of the feeder rotor 10, a buffer chamber 35 is present, separated from the pre-compression chamber by said inlet section 23. The floor of said chamber is formed by a conveyor belt 36, the ceiling of the buffer chamber is formed by a plate 37, while the remaining side walls of the buffer chamber are formed by plates that are preferably parallel to the plane of the drawing, i.e. the buffer chamber has a substantially constant width in the direction of movement of the crops. Alternatively, the buffer chamber's sidewalls can be converging in the direction of movement of the crops. This may be achieved by placing these converging sidewalls in between the floor conveyor belt 36 and the ceiling plate 37, so that a gradually decreasing portion of the floor conveyor belt is in contact with the crops as they advance towards the pre-compression chamber. The buffer chamber is configured to receive crops directly from the feeder rotor 10, and is further configured to deliver crops to the inlet section 23 of the pre-compression chamber 20. The buffer chamber 35 is instrumental in ensuring an improved filling cycle of the pre-compression chamber 20 and of the baling chamber 2. The rotation of the belts 21/22 is actuated according to a speed cycle, wherein the belts are moving at a lower speed during filling of the pre-compression chamber, followed by a brief acceleration of the speed for propelling the crops that have accumulated in the pre-compression chamber 20 into the baling chamber 2. This cycle is synchronized with the reciprocating movement of the plunger 1, so that a fresh slice of pre-compressed crops is fed into the baling chamber when the plunger is retracted towards the back of the baling chamber.

The floor conveyor belt 36 of the buffer chamber 35 is configured to move at a constant speed. In this way, fluctuations in the supply of crops from the rotor 10 to the buffer chamber 35 are evened out, and crops are delivered at an essentially constant supply rate to the pre-compression chamber 20. Regardless of the fact that a constant speed is preferred for the floor conveyor belt 36, said belt is preferably provided with a means for varying said speed, e.g. the speed may be increased to overcome a blockage of crop due to a to large infeed of crop in the buffer chamber 35.

The buffer chamber 35 may be oriented horizontally or in the case of the embodiment of FIG. 3, at an angle β that is less acute than the angle α of the pre-compression chamber. The ceiling plate 37 of the buffer chamber 35 may be placed parallel to the floor conveyor belt 36, as shown in the drawing. Alternatively, the distance between the floor conveyor belt 36 and the ceiling plate 37 may be converging in the direction of the movement of the crops. According to a particular embodiment, the position of the ceiling plate 37 is adjustable, for example by rotating the plate about a hinge and/or by displacing the plate closer to or further away from the floor conveyor belt 36, so as to achieve a parallel or converging arrangement at varying distances and angles. This adjustment allows to adapt the cross-section of the buffer chamber to the circumstances (type of crop, humidity, etc. . . . ).

According to the embodiment of FIG. 3, the cross-section of the buffer chamber, taken along a plane B perpendicular to the floor conveyor belt 36, is larger than the cross-section of the pre-compression chamber 20 taken along a plane A perpendicular to the walls 29/30 of the pre-compression chamber. When said cross-sections are rectangular, this means that the distance B' is larger than the distance A'. In other words, when passing from the buffer chamber to the pre-compression chamber, crops are compressed between the belts 21/22. As further illustrated by the embodiment of FIG. 3 but not limited to that embodiment, the height of the section through which the crops are moving changes from the value B' at the end 45 of the ceiling plate, to a lower value C at the section where the distance between the lower roll 25 of the upper conveyor belt 21 and the buffer chamber's floor conveyor belt 36 is minimal. As the crops reach the end of the ceiling plate 37, they are initially compressed between the roll 25 and the floor conveyor belt 36, from a cross-section with height B' to a cross-section with a lower height C. Generally stated, the ceiling 37 of the buffer chamber is positioned in such a way with respect to the first guide roll 25 of the upper conveyor belt 21 of the pre-compression chamber, that the crops are compressed between said first guide roll 25 and the buffer chamber's floor conveyor belt 36, as they move from the section defined by the end 45 of the buffer chamber's ceiling 37 to the section where the distance (C') between said first guide roll and the buffer chamber's floor conveyor belt is minimal. During a phase of the crops' progress, they are thus supported at the top by the upper conveyor belt 21 of the pre-compression chamber and at the bottom by the buffer chamber's floor conveyor belt 36. The floor conveyor belt 36 of the buffer chamber therefore extends beyond the end 45 of the buffer chamber's ceiling plate 37 in the direction of movement of the crops. This initial compression is beneficial in establishing sufficient grip on the crops for moving them upwards through the space between the conveyor belts 21 and 22. This embodiment makes it clear that the physical boundary between the buffer chamber and the pre-compression chamber, said boundary being the inlet section 23, does not necessarily signify that the crops are supported only by the ceiling plate 37 and floor conveyor 36 at one side of said section 23, and only by the conveyor belts 21/22 at the other side.

As an alternative for the ceiling plate 37 (at constant distance or converging distance from the floor belt 36), the buffer chamber 35 may be equipped with a top conveyor belt (equally at constant or converging distance from the floor belt), preferably configured to move at a constant speed, preferably the same speed as the floor conveyor belt 36.

Although the buffer chamber 35 has been described in the previous paragraphs in combination with a conveyor-operated pre-compression mechanism equipped with an upper and lower conveyor belt 21/22, the invention is not limited to that combination. The invention is equally related to a baler equipped with the buffer chamber 35 as described above in combination with any known pre-compression mechanism, for example the mechanism equipped with a stuffer fork 7, illustrated in FIG. 1. The buffer chamber's advantages in terms of evening out the supply of crops to the pre-compression chamber are valid regardless of the type of pre-compression mechanism that is used. In the case of a conveyor-operated pre-compression chamber, the buffer chamber offers a specific advantage, in that the load that is exerted on the rolls 25 to 28 is more constant compared to the case where no buffer chamber is applied.

According to a further embodiment, that is specifically limited to the pre-compression mechanism equipped with conveyor belts 21/22, the setup of FIG. 3 is supplemented by a means for intermittently closing off the pre-compression chamber 20 at the pre-compression chamber's inlet 23 and/or at its outlet 24. These closing means are operated in a synchronized way with respect to the filling cycle of the pre-compression chamber, in order to avoid inefficient pre-compression conditions. FIG. 4A-C illustrates the filling cycle when a closing means 40 is provided at the pre-compression chamber's inlet section 23. The closing means is shown schematically as a sliding plate 40 which can be inserted into and retracted from the inlet section 23. In FIG. 4A, the pre-compression chamber is filled with crop material. At this moment, the inlet of the pre-compression chamber is closed, after which the belts 21/22 accelerate in order to propel the crops upwards into the baling chamber (hereafter this phase is called the 'stuffing phase'), see FIG. 4B. The closure of the inlet 23 by the closing means 40 ensures that no crop material enters the pre-compression chamber during the stuffing phase. When the belts 21/22 are again moving at a lower speed, the inlet to the pre-compression chamber is opened and the crops are allowed to enter the chamber (FIG. 4C).

During the stuffer phase, crops are continued to be fed into the buffer chamber 35. Once the inlet 23 is no longer closed by the closing means 40, crops will then be allowed to enter the pre-compression chamber 20 by movement of the different belts 21, 22, 36. However, since an amount of crop is already available in the buffer chamber, this will take up any variations in the crop which is being picked up from the field. If temporarily a small amount of crops is picked up from the field, the amount already available in the buffer chamber will compensate for the deficiency and will provide an overall equal feed to the pre-compression chamber. Also, a temporary increase in the amount of crop will be stored in the buffer chamber without being immediately fed to the pre-compression chamber. That way, an almost constant feed is accomplished from the buffer chamber to the pre-compression chamber and later on to the baling chamber, resulting in a homogeneous compacted slice throughout the entire formed bale. In the embodiment of FIG. 4A-C, the belts 21/22 preferably have a constant high roughness over their entire surface, said roughness being high enough so that a sufficient gripping force may be exerted on a slice of crop material, in order to propel said slice into the baling chamber 2.

According to another embodiment, a closing means 41 is provided at the outlet section 24 of the pre-compression chamber, as illustrated in FIG. 5A-D. In this embodiment, the belts 21/22 preferably have a high friction portion 38 and a low friction portion 39. FIG. 5A shows the stage where the pre-compression chamber is filled with a slice of crop material that is ready to be fed into the baling chamber. The closing means 41 is opened to allow the passage of the slice into the baling chamber. As seen in the drawings, the high friction portions of the belts 21/22 are positioned to form the major parts of the pre-compression chamber's upper and lower walls at this moment, so that a large gripping force is exerted on the slice when the slice is propelled at high speed upwards into the baling chamber (FIGS. 5B and 5C). When the slice has fully entered the baling chamber, the pre-compression chamber is closed off at its outlet section (FIG. 5D), and a fresh filling cycle can commence: the belt speed is lowered and material is fed from the buffer chamber 35 into the pre-compression chamber 20, while the closing means 41 at the top prevents crops being prematurely fed into the baling chamber. During the high-speed stuffing phase (FIGS. 5B and 5C), the low friction portions 39 of the belts do not exert a large gripping force onto the crop so that no large amount of crop is entering prematurely into the pre-compression chamber during said stuffing phase. As seen in FIG. 5C, some material may enter the pre-compression chamber by the time the high-friction portions are once again positioned at the inlet of the pre-compression chamber, but this amount of material is not enough to cause substantial problems during the filling cycle (such as the formation of a prematurely compressed volume of material at the top of the pre-compression chamber). This is why the belts 21/22 are preferably provided as having a high friction portion 38 and a low friction 39 portion in this embodiment. However, the premature filling of the pre-compression chamber may not be as problematic as set out above, depending on the type of crops that are harvested or the weather circumstances. Therefore, the invention also includes the embodiment of FIG. 5A-D wherein the belts 21/22 are provided with a surface that exerts a constant friction force on the crops (i.e. with a constant roughness over the entire surface of the belt).

The invention is equally related to a baler wherein closing mechanisms 40/41 are mounted at the inlet 23 and at the outlet 24 of the pre-compression chamber. The operation of the pre-compression cycle in that case is the combination of the cycles described with reference to FIGS. 4A-C and 5A-D, with the belts 21/22 preferably being provided with a constant roughness over their entire surface.

Figure 6A:
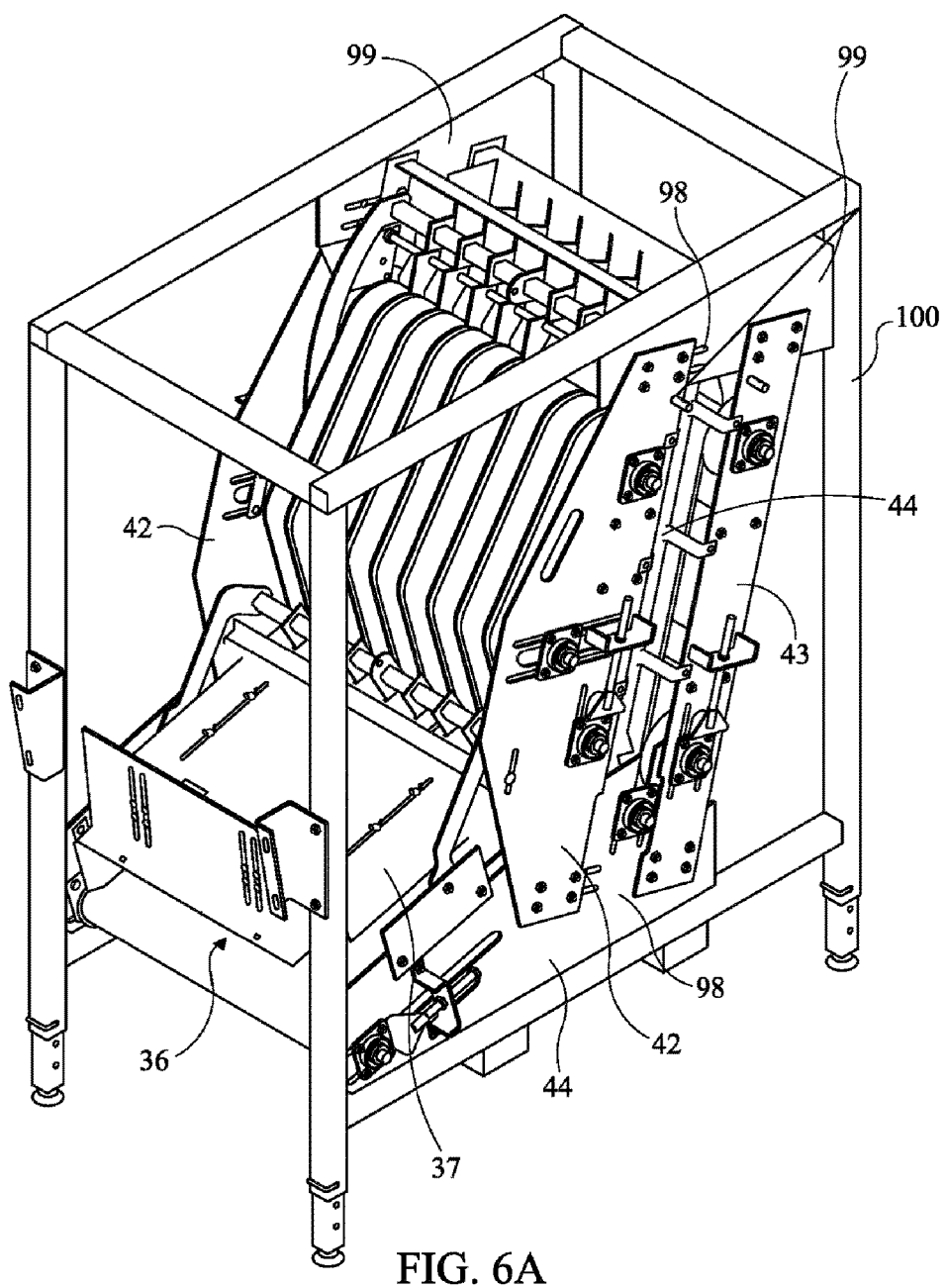
FIGS. 6a and 6b illustrate a test setup of a buffer chamber and pre-compression chamber according to an embodiment of the invention.
Figure 6B:
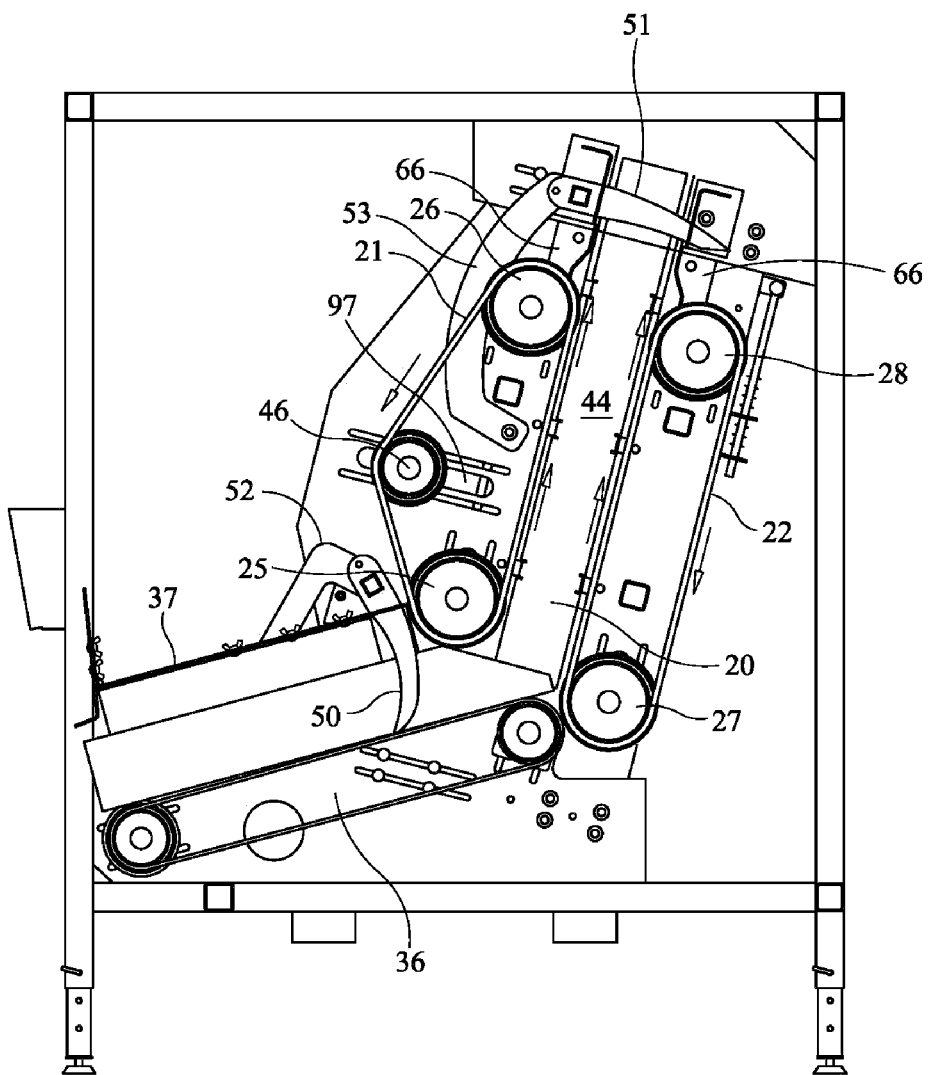

FIGS. 6A and 6B show a more developed version of the pre-compression mechanism in a baler according to a preferred embodiment of the invention. The mechanism is shown in a design for a test setup, and is therefore mounted in a separate test frame 100. The installation of the mechanism into an actual baler is similar to the installation in the test frame 100. The guide rolls of the conveyor belts 21/22 are rotatably mounted between vertically placed pairs of lateral plates 42 and 43. The buffer chamber 35 is delimited by vertical sidewalls 44. The lateral plates 42/43 are mounted in a fixed position, between the buffer chamber's sidewalls and auxiliary walls 99 mounted at the top of the frame 100. The plates 42 that are carrying the upper belt 21 can be positioned closer to or further away from the lower belt 22, via slots 98 provided in the buffer chamber's side walls 44 and in the auxiliary walls 99. The upper belt 21 is guided by the two rolls 25/26 and by an extra tension roll 46, the latter being slidable in slots 97 provided in the lateral plates 42. The tension roll can be fixed at any position within the slots 97, to thereby apply a higher or lower pre-tension to the upper conveyor belt 21.

Figure 7A:
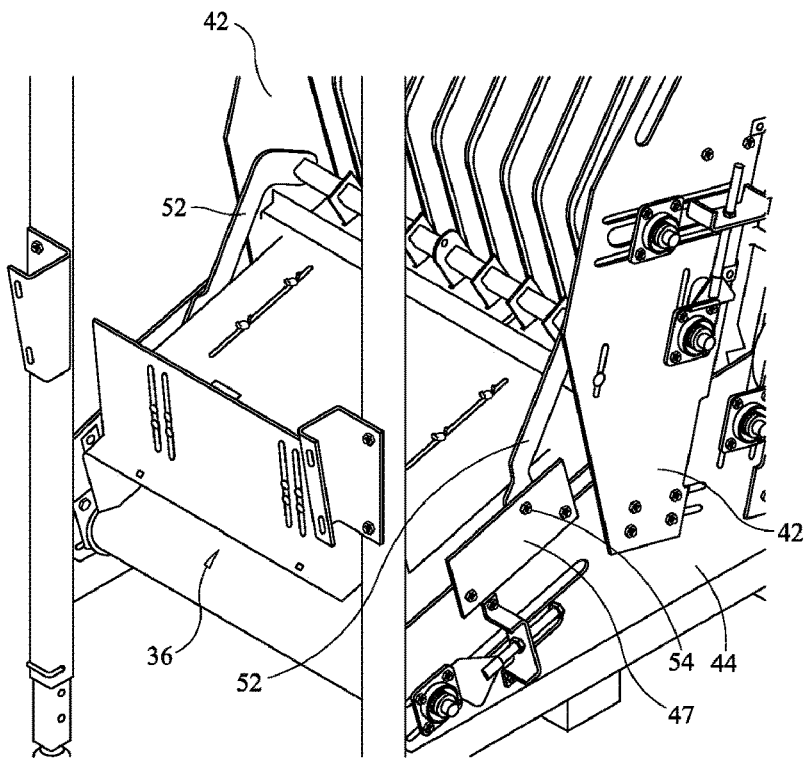
FIGS. 7a and 7b show a concrete version of the closing mechanism at the inlet of the pre-compression chamber.
Figure 7B:
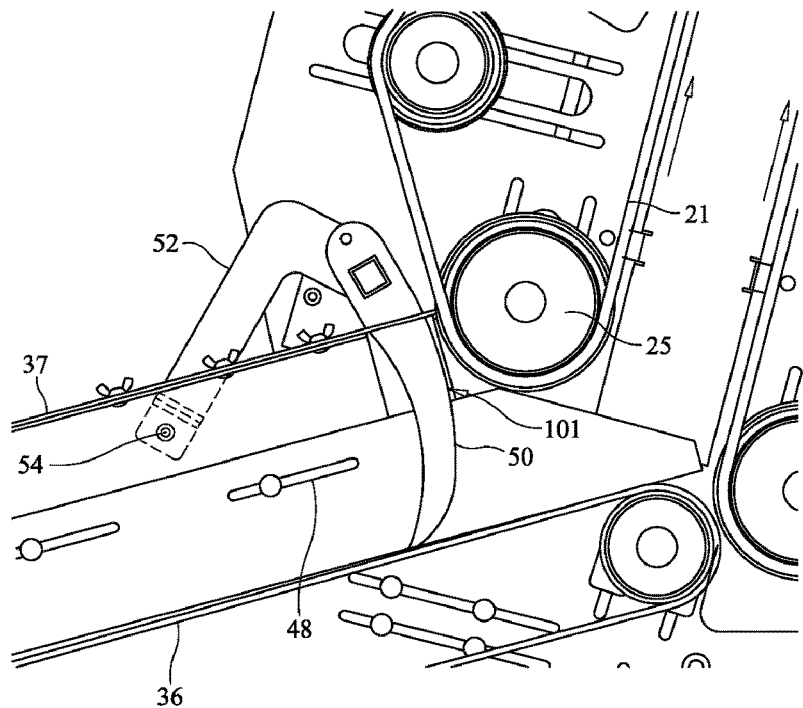

In this embodiment, the closing means 40 and 41 described above are formed by rows of pivotable closing hooks 50 and 51 respectively, actuated by sets of rotatable arms 52 and 53 respectively. The closing hooks 50 at the inlet are shown in more detail in FIGS. 7A and 7B. As the hooks are rotated into the closing position, they are able to slide into corresponding slots in the upper wall 37 of the buffer chamber. The actuator arms 52 are rotatably connected to the buffer chamber's side walls 44 at rotation points 54. In the embodiment shown, these rotation points are not located on the sidewalls 44 directly, but on positionable platelets 47 (only shown in FIG. 7A) mounted at a variable position via slots 48. In this way, the position of the closing hooks 50 can be adapted to the variable position of the upper conveyor belt 21, so that the convex sides 101 of the hooks are always in close proximity to the lower end of the upper conveyor belt 21 when the hooks are closing off the pre-compression chamber, as shown in FIG. 7B. As can be seen on FIG. 7A, but also on FIGS. 8A and 10A, the closing hooks 50/51 are formed as a number of parallel placed thin plates all attached to a central shaft. Rotatable actuator arms 52/53 are connected to this central shaft such that all closing hooks 50/51 will move in a synchronized manner in and out of the pre-compression chamber 20.

Figure 8A:
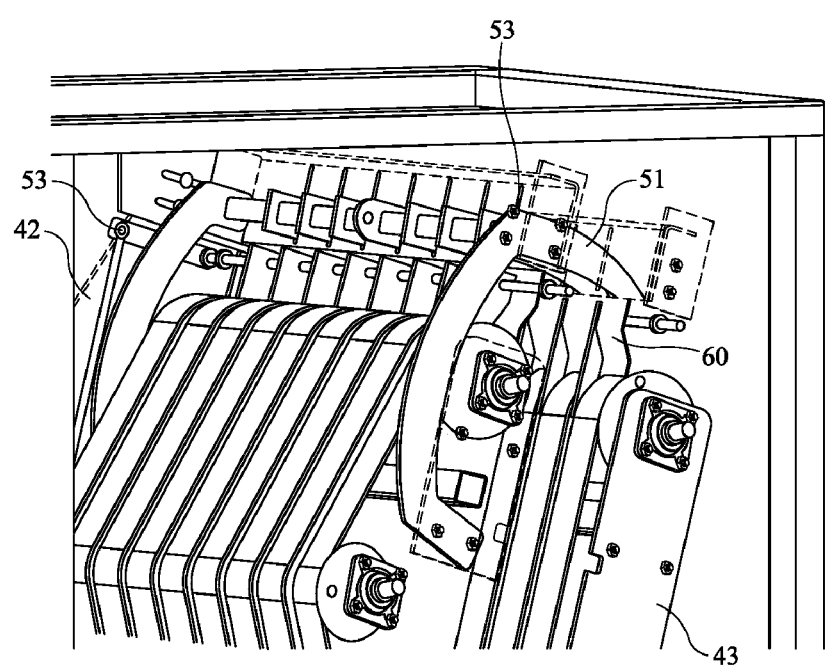
FIGS. 8a and 8b show a concrete version of the closing mechanism at the outlet of the pre-compression chamber.
Figure 8B:
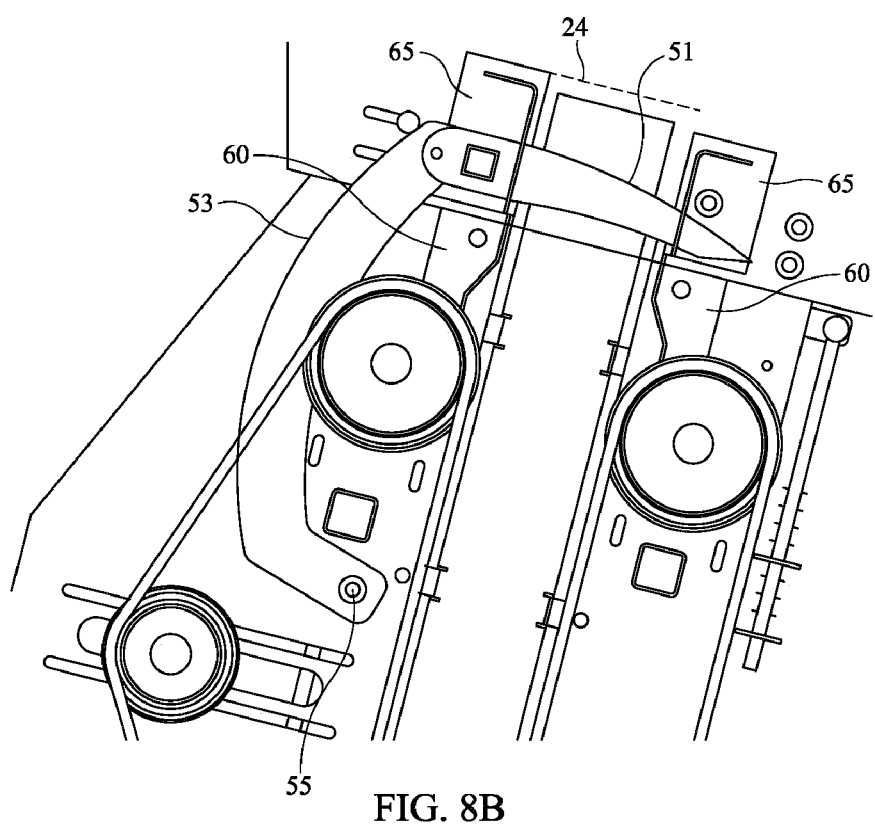
Figure 9:
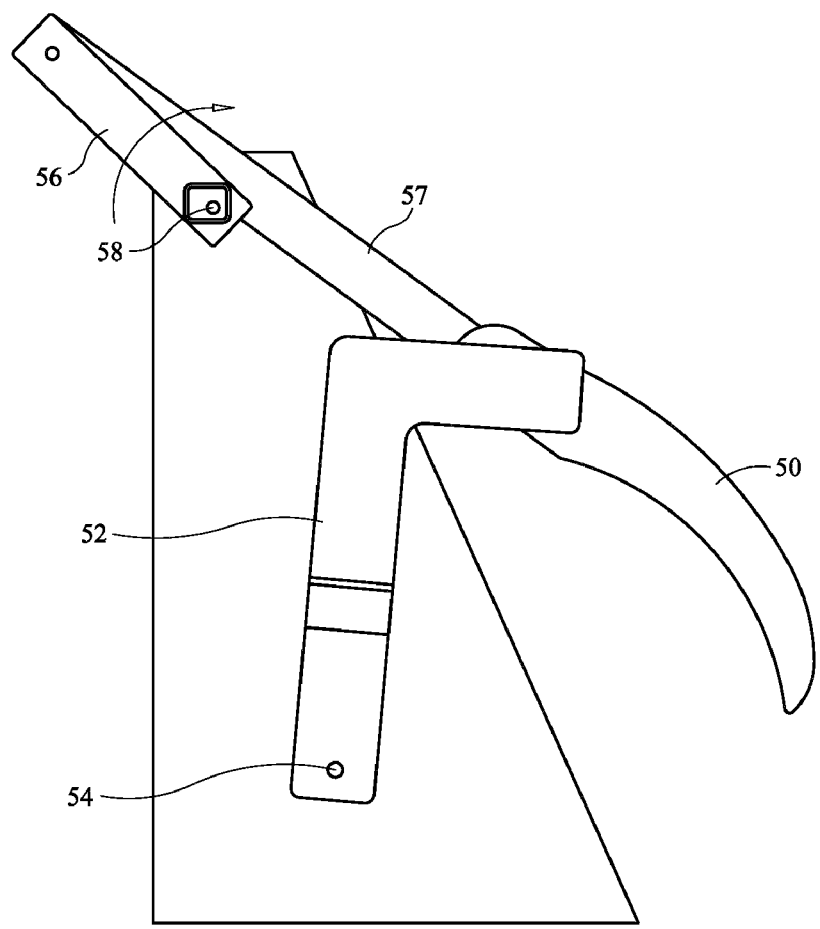
FIG. 9 illustrates a possible actuation mechanism for driving the movement of the closing hooks at the inlet of the pre-compression chamber.

The closing hooks 51 at the outlet of the pre-compression chamber are shown in more detail in FIGS. 8A and 8B. The rotatable actuator arms 53 are connected to the lateral plates 42 at rotation points 55. The hooks 50/51 at the inlet and outlet can be driven by any suitable driving means, e.g. a servomotor mounted on the rotation axis 54/55, or preferably two servomotors, one on each side of the conveyor belts. FIG. 9 shows a particularly suitable driving mechanism for the hooks at the inlet, but also suitable for the outlet, wherein the hook rotation is driven by a crank mechanism 56/57, which is itself rotated about an axis 58 by a suitable driving means (e.g. a servomotor). The crank mechanism 56/57 can be configured to exert the driving force at the midpoint of the array of hooks 50.

Figure 10A:
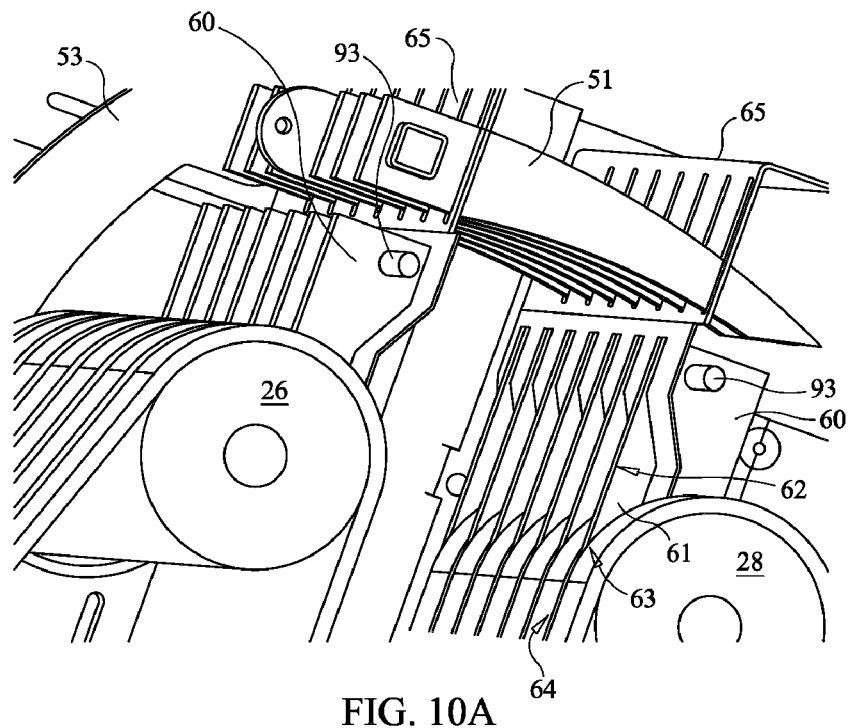
FIGS. 10a and 10b illustrate an embodiment of the scrapers mounted near the outlet of the pre-compression chamber.
Figure 10B:
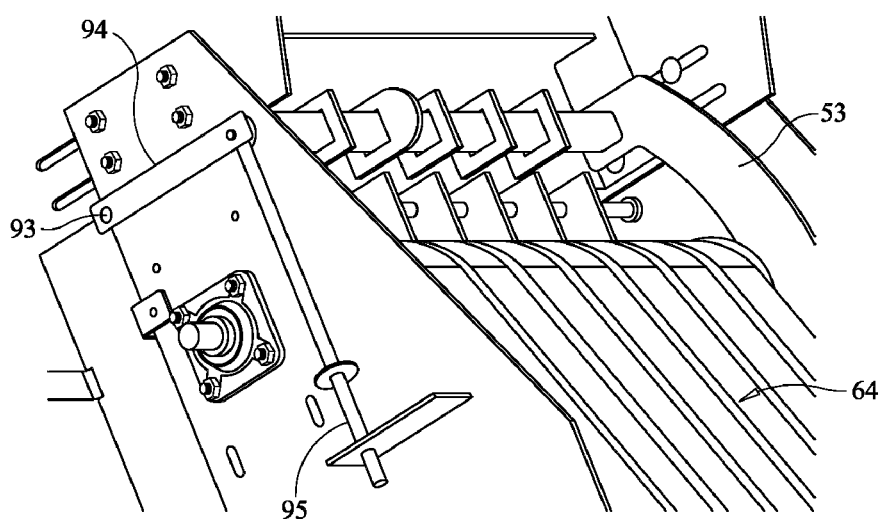

According to the preferred embodiment illustrated in FIGS. 8A and 8B and in more detail in FIGS. 10A and 10B, scraper means 60 are mounted between the end of the conveyor belts 21/22 and the position of the hooks 51 in the closed condition. As seen in FIG. 8B, the scrapers 60 are placed between the conveyor belts 21/22 and the outlets section 24 of the pre-compression chamber. Their aim is to avoid crop materials from being trapped in the area between the rolls 26/28 and the baling chamber. Each scraper is provided with a row of teeth 61, which are placed against the surface of the conveyor belts, so that the belts are sliding against the lower surface of the teeth. Preferably the scrapers are spring-mounted so that the teeth are pushed against the belt surface by a spring force, as shown in FIG. 10B. The spring 95 and crank mechanism 94 push the teeth, being pivotable about the axis 93, against the belt surface. The teeth 61 have a straight top surface 62 which is flush with the surface of the belts 21/22, and a rounded lower surface 63 that fits around the circumference of the conveyor belts at the position of rolls 26 and 28. According to a preferred embodiment, the surfaces of the belts are provided with grooves 64 into which the lower surfaces 63 of the teeth are slidably arranged. The grooves have a low friction surface, while the belt areas between the grooves have a higher friction surface. In this way, the teeth form a minimum obstruction to the belt's movement, while still allowing the belt to exert the required friction force on the crops. Above the scrapers 60, slotted plates 65 are mounted. The slots in these plates are configured to allow the passage of the closing hooks 51 as they are moving into the closing position.

Figure 11A:
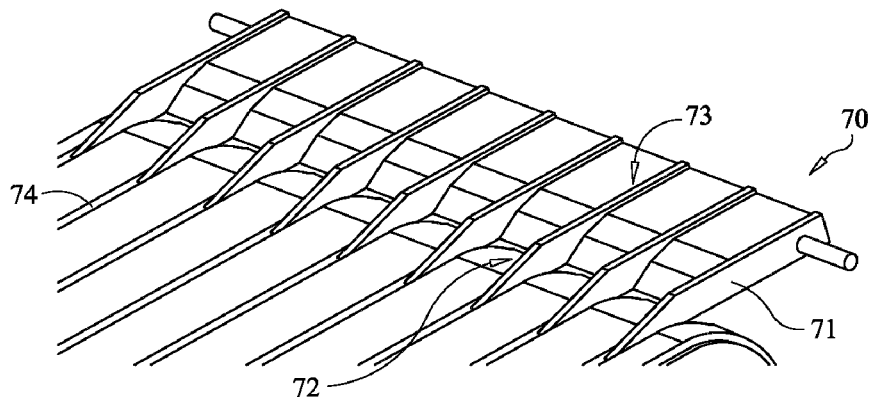
FIGS. 11a and 11b illustrate another embodiment of scrapers mounted near the outlet of the pre-compression chamber.
Figure 11B:
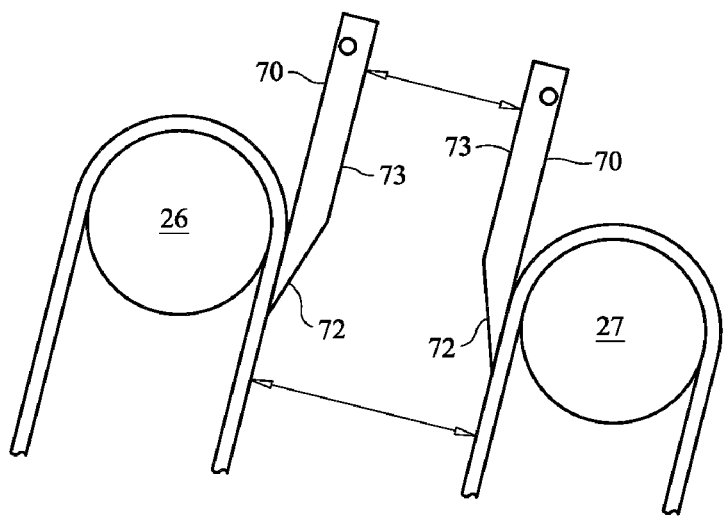

According to another embodiment shown in FIGS. 11A and 11B, the scrapers 70 comprise a row of teeth 71 wherein the lower surface of the teeth is straight and the upper surface of each tooth has a slanted portion 72 and a portion 73 that is essentially parallel to the side walls of the pre-compression chamber. The teeth are positioned with their lower surface against the surface of the belts, preferably pushed against said surface by a spring force, preferably being pushed into low friction grooves 74 provided in the belts (as described above). Crops that are being moving towards the end of the pre-compression chamber are lifted up from the surface of the belts by the slanted portions 72. In this embodiment, the cross section of the pre-compression chamber is slightly diminished due to the presence of the scrapers, as illustrated in FIG. 11B.

Figure 12:
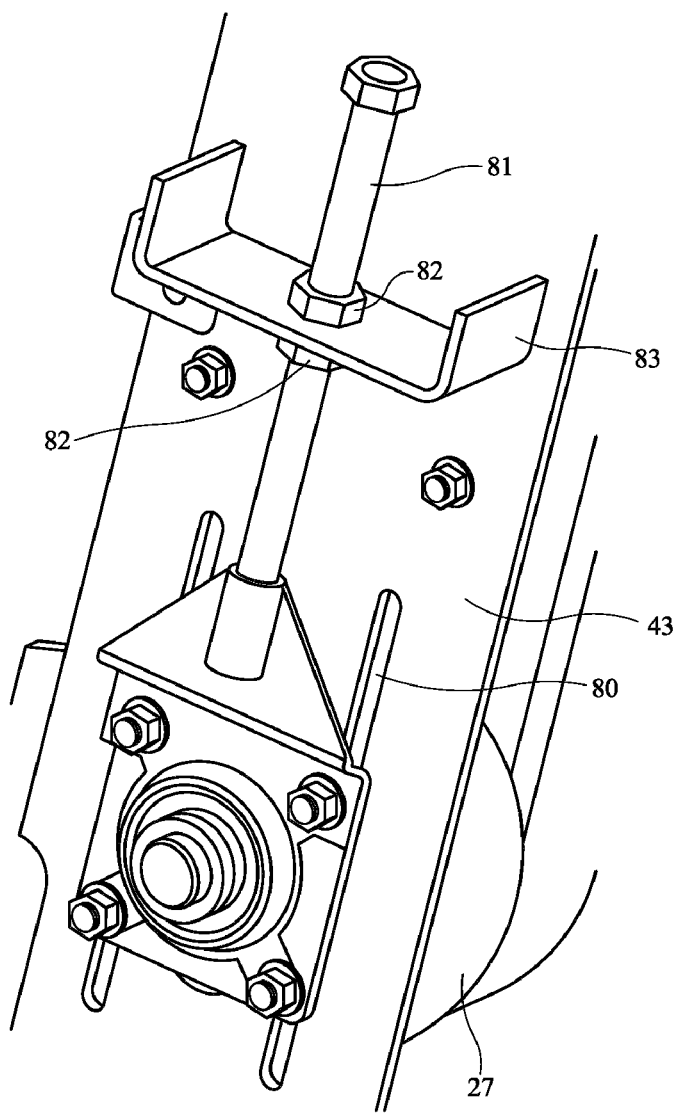
FIG. 12 illustrates a way of establishing a tensioning of the lower conveyor belt of the pre-compression chamber.

The tensioning of the lower belt conveyor 22 may be established by a suitable tensioning means. One embodiment thereof is illustrated in FIG. 12. The roll 27 is slidably mounted with respect to the lateral plates 43, through slots 80 provided in said plates. The position of the roll and thereby the tension in the belt can be adjusted by turning the screw 81 and fixing it with the bolts 82 on either side of a bracket 83, fixed on the lateral plates 43. As seen in FIG. 7A, tensioning the buffer chamber's floor conveyor belt 36 can be established by a similar system.

The invention claimed is:

1. An agricultural baler comprising:
   a pre-compression chamber, having an inlet section, an outlet section and an upper wall and lower wall defining a channel between said inlet and outlet sections,
   a crop material supply configured to supply crop material to said pre-compression chamber,
   a baling chamber equipped with a plunger for forming rectangular bales,
   wherein a buffer chamber is provided between the crop material supply and the pre-compression chamber, the floor of said buffer chamber being formed by a conveyor belt, the ceiling of said buffer chamber being formed by a plate or by a further conveyor belt, and the buffer chamber being further delimited by sidewalls on either side of the conveyor belt;

wherein the upper wall and lower wall of said pre-compression chamber are formed by an upper conveyer belt and lower conveyor belt respectively, each belt being guided by a first guide roll at the inlet of the pre-compression chamber and a second guide roll at the outlet of said pre-compression chamber, said belts being configured to receive crop material in a space between said belts and to transport crop material accumulated in said space into the baling chamber;

wherein the ceiling of the buffer chamber is positioned in such a way with respect to the first guide roll of the upper conveyor belt of the pre-compression chamber, that the crops are compressed between said first guide roll and the buffer chamber's floor conveyor belt, as they move from the section defined by the end of the buffer chamber's ceiling to the section where the distance between said first guide roll and the buffer chamber's floor conveyor belt is minimal.

2. The baler of claim 1, wherein the ceiling of said buffer chamber is formed by the plate and the plate is adjustable with respect to said conveyor belt.

3. The baler of claim 1, wherein said upper and lower walls of the pre-compression chamber are straight and mutually parallel walls and wherein the floor and the ceiling of the butter chamber are equally straight and mutually parallel, wherein the distance between the floor and ceiling of the buffer chamber is larger than the distance between the upper and lower walls of the pre-compression chamber, and
wherein said upper and lower walls of the pre-compression chamber are at an angle α with respect to a horizontal direction, said angle α being steeper than an angle β formed with respect to the horizontal direction by the buffer chamber's floor and ceiling.

4. The baler of claim 1, wherein at least one of the floor and the ceiling of the buffer chamber and the upper and lower wall of the pre-compression chamber are converging in a direction of movement of crops.

5. An agricultural baler comprising:
a pre-compression chamber, having an inlet section, an outlet section and an upper wall and lower wall defining a channel between said inlet and outlet sections,
a crop material supply configured to supply crop material to said pre-compression chamber,
a baling chamber equipped with a plunger for forming rectangular bales,
wherein a buffer chamber is provided between the crop material supply and the pre-compression chamber, the floor of said buffer chamber being formed by a conveyor belt, the ceiling of said buffer chamber being formed by a plate or by a further conveyor belt, and the buffer chamber being further delimited by sidewalls on either side of the conveyor belt;
wherein the upper wall and lower wall of said pre-compression chamber are formed by an upper conveyor belt and lower conveyor belt respectively, each belt being guided by a first guide roll at the inlet of the pre-compression chamber and a second guide roll at the outlet of said pre-compression chamber, said belts being configured to receive crop material in a space between said belts and to transport crop material accumulated in said space into the baling chamber;
wherein a closing mechanism is mounted between the buffer chamber and the pre-compression chamber, configured to close off access to the inlet section of the pre-compression chamber while the belts are feeding crop material into the baling chamber.

6. The baler of claim 5, wherein said closing mechanism comprises a row of pivotable hooks mounted between a pair of actuation arms, said arms being rotatable about rotation points connected to the sidewalls of said buffer chamber, and a driving means for driving the rotation of said actuation arms to thereby move the hooks into or out of the path of the crops moving from the buffer chamber to the pre-compression chamber.

7. The baler of claim 6, wherein said upper conveyor belt forming the upper wall of the pre-compression chamber is displaceable so as to position said conveyor belt at a variable distance from the pre-compression chamber's lower conveyor belt, and wherein said rotation points are displaceable so as to position the hooks at a variable distance from the inlet section of the pre-compression chamber.

8. The baler of claim 1, wherein a closing mechanism is mounted at the outlet of the pre-compression chamber, configured to close off access to the outlet section of the pre-compression chamber while crop material is being fed into the pre-compression chamber.

9. The baler of claim 8, wherein said closing mechanism at the outlet of the pre-compression chamber comprises a row of pivotable hooks mounted between a pair of actuation arms, said arms being rotatable about rotation points, and a driving means for driving the rotation of said actuation arms to thereby move the hooks into or out of the path of the crops moving from the pre-compression chamber to the baling chamber.

10. An agricultural baler comprising:
a pre-compression chamber, having an inlet section, an outlet section and an upper wall and lower wall defining a channel between said inlet and outlet sections,
a crop material supply configured to supply crop material to said pre-compression chamber,
a baling chamber equipped with a plunger for forming rectangular bales,
wherein a buffer chamber is provided between the crop material supply and the pre-compression chamber, the floor of said buffer chamber being formed by a conveyor belt, the ceiling of said buffer chamber being formed by a plate or by a further conveyor belt, and the buffer chamber being further delimited by sidewalls on either side of the conveyor belt;
wherein the upper wall and lower wall of said pre-compression chamber are formed by an upper conveyer belt and lower conveyor belt respectively, each belt being guided by a first wide roll at the inlet of the pre-compression chamber and a second guide roll at the outlet of said pre-compression chamber, said belts being configured to receive crop material in a space between said belts and to transport crop material accumulated in said space into the baling chamber;
wherein a set of scrapers is provided before the outlet section of the pre-compression chamber, each scraper comprising a plurality of parallel teeth having a lower surface that is slidably mounted with respect to the conveyor belts forming said pre-compression chamber, and a top surface configured to support a slice of pre-compressed crop material and guide said slice towards the outlet section.

11. The baler of claim 10, wherein said top surface of the teeth is flush with the upper and lower walls of the pre-compression chamber, and said lower surface of the teeth has a rounded portion that is slidably arranged around the conveyor belts at the position of the upper guide rolls of said belts.

12. The baler of claim 10, wherein lower surface of the teeth is straight and said top surface of the teeth comprises a slanted portion and a portion that is essentially parallel to the upper and lower walls of the pre-compression chamber.

13. The baler of claim 10, wherein the surface of the belts is provided with grooves, and wherein the teeth are configured to slide in said grooves, said grooves having a lower roughness than the rest of the belt surface.

14. The baler of claim 10, wherein said scrapers are spring-mounted so that the lower surface of the teeth is pushed against the belt surface by a spring force.

15. The baler of claim 1, wherein the surface of each of said conveyor belts forming the pre-compression chamber comprises or consists of a first portion having a higher roughness and a second portion having a lower roughness, said portions being arranged in the direction of movement of the belt, portions of the same roughness on both belts facing each other during the movement of the belts.

16. A method of providing crop material to a baling chamber, said method comprising:
    supplying crop material to a buffer chamber, while a floor conveyer belt of said buffer chamber is moving at a constant speed,
    moving said crop material from the buffer chamber into a pre-compression chamber while upper and lower conveyor belts of the pre-compression chamber are moving,
    when said pre-compression chamber is filled with a slice of crop material, propelling said slice into the baling chamber by gripping a batch through a friction force exerted by said conveyor belts, thereby emptying the pre-compression chamber,
    repeating said acts of filling and emptying the pre-compression chamber;
    wherein the speed of said conveyor belts are increased prior to the act of propelling said batch into the baling chamber, and decreased after said act.

17. The method of claim 16, wherein a closing mechanism is present at an inlet of the pre-compression chamber, said method comprising:
    supplying crop material to the buffer chamber, while the floor conveyer belt of said buffer chamber is moving at a constant speed, and while said closing mechanism is in an open condition, allowing access to the inlet of said pre-compression chamber,
    moving said crop material from the buffer chamber into the pre-compression chamber while said upper and lower conveyor belts of the pre-compression chamber are moving,
    when said pre-compression chamber is filled with a slice of crop material, closing said closing mechanism, and propelling said slice into the baling chamber by gripping the slice through the friction force exerted by said conveyor belts, thereby emptying the pre-compression chamber,
    opening said closing mechanism,
    repeating said steps of filling and emptying the pre-compression chamber.

18. The method of claim 16, wherein a closing mechanism is present at an outlet of the pre-compression chamber, said method comprising:
    supplying crop material to the buffer chamber, while the floor conveyer belt of said buffer chamber is moving at a constant speed, and while said closing mechanism is blocking the access to the outlet of the pre-compression chamber,
    moving said crop material from the buffer chamber into the pre-compression chamber while said upper and lower conveyor belts of the pre-compression chamber are moving,
    when said pre-compression chamber is filled with a slice of crop material, opening said closing mechanism, and propelling said slice into the baling chamber by gripping the slice through the friction force exerted by said conveyor belts, thereby emptying the pre-compression chamber,
    closing the closing mechanism,
    repeating said steps of filling and emptying the pre-compression chamber.

19. The method of claim 16, wherein a first closing mechanism is present at the inlet of the pre-compression chamber, and a second closing mechanism is present at the outlet of the pre-compression chamber, said method comprising:
    surviving crop material to the buffer chamber, while the floor conveyer belt of said buffer chamber is moving at a constant speed, while said first closing mechanism is in the open condition, allowing access to the inlet of the pre-compression chamber and while said second closing mechanism is blocking the access to the outlet of the pre-compression chamber,
    moving said crop material from the buffer chamber into the pre-compression chamber while said upper and lower conveyor belts of the pre-compression chamber are moving,
    when said pre-compression chamber is filled with a slice of crop material, closing said first closing mechanism and opening said second closing mechanism, and propelling said slice into the baling chamber by gripping the slice through the friction force exerted by said conveyor belts, thereby emptying the pre-compression chamber,
    opening said first closing mechanism and closing said second closing mechanism,
    repeating said acts of filling and emptying the pre-compression chamber.

\* \* \* \* \*